(12) United States Patent
Achen et al.

(10) Patent No.: US 9,674,999 B2
(45) Date of Patent: *Jun. 13, 2017

(54) REMOTE ADJUSTMENT OF A ROW UNIT OF AN AGRICULTURAL DEVICE

(71) Applicant: Kinze Manufacturing, Inc., Williamsburg, IA (US)

(72) Inventors: Courtney N. Achen, Iowa City, IA (US); Marvin Bachman, Marengo, IA (US); Vaughan G. Stevenson, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 191 days.

This patent is subject to a terminal disclaimer.

(21) Appl. No.: 14/534,920

(22) Filed: Nov. 6, 2014

(65) Prior Publication Data
US 2015/0066315 A1   Mar. 5, 2015

Related U.S. Application Data

(63) Continuation of application No. 13/457,577, filed on Apr. 27, 2012, now Pat. No. 8,909,436.
(Continued)

(51) Int. Cl.
*A01B 49/04* (2006.01)
*A01B 63/00* (2006.01)
(Continued)

(52) U.S. Cl.
CPC ............ *A01B 63/008* (2013.01); *A01B 49/04* (2013.01); *A01B 71/02* (2013.01); *A01B 79/005* (2013.01);
(Continued)

(58) Field of Classification Search
CPC ......... A01B 49/04; A01B 49/00; A01B 71/02; A01B 71/00; A01B 79/005; A01B 79/00;
(Continued)

(56) References Cited

U.S. PATENT DOCUMENTS 3,749,035 A    7/1973  Cayton et al.
4,085,862 A *  4/1978  Steffen .................. A01C 7/105
                                                111/180
(Continued)

FOREIGN PATENT DOCUMENTS

GB        2126062 A      3/1984

OTHER PUBLICATIONS

Kinze Manufacturing, Inc., PCT/US2012/035585, "International Search Report and Written Opinion" 9 pages, dated Jul. 10, 2012.
(Continued)

*Primary Examiner* — Christopher J Novosad
(74) *Attorney, Agent, or Firm* — McKee, Voorhees & Sease, PLC

(57) ABSTRACT

Agricultural devices, row unit adjustment systems, and methods of adjusting a depth of a furrow are provided. In some aspects, an agricultural device is adapted to plant seeds and includes a frame, a furrow opener coupled to the frame and adapted to cut a furrow including a depth, a sensor adapted to sense a characteristic associated with planting seeds and generate a signal associated with the sensed characteristic, and a processing unit receiving the signal associated with the sensed characteristic. The depth of the furrow is adjustable based on the signal associated with the sensed characteristic. Such characteristic may be a characteristic of the soil, a force applied to the agricultural device, or a position of a portion of the agricultural device.

11 Claims, 9 Drawing Sheets

Related U.S. Application Data

(60) Provisional application No. 61/479,540, filed on Apr. 27, 2011, provisional application No. 61/479,537, filed on Apr. 27, 2011, provisional application No. 61/479,543, filed on Apr. 27, 2011.

(51) Int. Cl.
*A01B 71/02* (2006.01)
*A01B 79/00* (2006.01)
*A01C 5/06* (2006.01)
*A01C 7/20* (2006.01)
*A01C 21/00* (2006.01)

(52) U.S. Cl.
CPC .............. *A01C 5/062* (2013.01); *A01C 5/064* (2013.01); *A01C 7/203* (2013.01); *A01C 7/205* (2013.01); *A01C 21/00* (2013.01); *Y10S 111/90* (2013.01); *Y10S 111/903* (2013.01)

(58) Field of Classification Search
CPC ..... A01B 63/008; A01B 63/002; A01B 63/00; A01C 5/062; A01C 5/06; A01C 5/00; A01C 5/064; A01C 7/203; A01C 7/201; A01C 7/20; A01C 7/00; A01C 7/205; A01C 21/00; Y10S 111/90; Y10S 111/00; Y10S 111/903
USPC ................ 111/134–137, 164, 190–195, 200; 172/239, 395, 397, 421, 538, 539; 701/50
See application file for complete search history.

(56) References Cited

U.S. PATENT DOCUMENTS

| | | | |
|---|---|---|---|
| 4,413,685 A | 11/1983 | Gremelspacher et al. | |
| 4,766,962 A | 8/1988 | Frase | |
| 4,923,015 A * | 5/1990 | Barsby .................. | E02F 9/2025 172/4.5 |
| 5,529,128 A | 6/1996 | Peterson et al. | |
| 5,544,709 A | 8/1996 | Lowe et al. | |
| 5,563,340 A | 10/1996 | Clowater et al. | |
| 5,621,666 A | 4/1997 | O'Neall et al. | |
| 6,016,714 A | 1/2000 | Smith et al. | |
| 6,148,747 A | 11/2000 | Deckler et al. | |
| 6,216,794 B1 | 4/2001 | Buchl | |
| 6,389,999 B1 | 5/2002 | Duello | |
| 6,701,857 B1 | 3/2004 | Jensen et al. | |
| 7,025,009 B2 | 4/2006 | Roibier | |
| 7,316,189 B2 * | 1/2008 | Fountain .............. | A01C 11/025 111/105 |
| 7,392,754 B2 | 7/2008 | Flikkema et al. | |
| 7,628,218 B2 | 12/2009 | Cresswell | |
| 7,726,251 B1 | 6/2010 | Peterson et al. | |
| 7,849,955 B2 | 12/2010 | Crabill et al. | |
| 8,078,367 B2 | 12/2011 | Sauder et al. | |
| 8,365,697 B2 | 2/2013 | Cleeves | |
| 8,418,636 B2 | 4/2013 | Liu et al. | |
| 8,909,436 B2 * | 12/2014 | Achen .................... | A01C 5/062 111/134 |
| 8,924,092 B2 * | 12/2014 | Achen .................... | A01B 49/04 111/200 |
| 8,935,986 B2 * | 1/2015 | Blomme ................ | A01C 5/062 111/164 |
| 2007/0272134 A1 | 11/2007 | Baker et al. | |
| 2008/0011207 A1* | 1/2008 | Kryzak .................. | A01H 4/001 111/100 |
| 2009/0112475 A1 | 4/2009 | Christy et al. | |
| 2010/0023430 A1 | 1/2010 | Hunter et al. | |
| 2010/0198529 A1 | 8/2010 | Sauder et al. | |
| 2012/0042813 A1 | 2/2012 | Liu et al. | |
| 2012/0046838 A1 | 2/2012 | Landphair et al. | |

OTHER PUBLICATIONS

Kinze Manufacturing, Inc., PCT/US2012/035563, "International Search Report and Written Opinion", 11 pages dated Jul. 13, 2012.
Kinze Manufacturing, Inc., PCT/US2012/035518, "International Search Report and Written Opinion", 9 pages dated Jul. 13, 2012.
Kranner et al., "Noninvasive Diagnosis of Seed Viability Using Infrared Thermography", Proceedings of the National Academy of Sciences, vol. 107, No. 8, pp. 3912-3917, Feb. 23, 2010.

* cited by examiner

REMOTE ADJUSTMENT OF A ROW UNIT OF AN AGRICULTURAL DEVICE

CROSS-REFERENCE TO RELATED APPLICATIONS

This application is a Continuation Application of U.S. Ser. No. 13/457,577 filed Apr. 27, 2012, which claims priority under 35 U.S.C. §119 to U.S. Provisional Patent Application Nos. 61/479,540, filed Apr. 27, 2011, 61/479,537, filed Apr. 27, 2011, and 61/479,543, filed Apr. 27, 2011, all of which are incorporated by reference in their entirety.

FIELD OF THE INVENTION

The present invention generally relates to agricultural devices and, more particularly, to cutting depth adjustment of a row unit of an agricultural device.

BACKGROUND

Conventional row units in agricultural planters are supported from a toolbar by a parallel linkage which permits each row unit to move vertically independent of the toolbar and other spaced row units based on the contour of the soil. Biasing means such as airbags may extend between the parallel linkage to provide supplemental or additional down force on the row unit. The furrow opening assembly on conventional row units consists of a pair of flat furrow opening disk blades and a pair of gauge wheels. The furrow depth cut by a row unit has long been recognized as having an impact on seed germination and emergence. Seed planted too deep will have delayed emergence while shallow seeding depth may lead to root development problems.

Past attempts have relied on sensing loads applied to the gauge wheels and then adjusting the biasing means extending between the parallel linkage to provide supplemental or additional down force. One problem with this approach is a lack of accuracy and unpredictability in the system. First, when the biasing means is an airbag, it can be difficult to precisely determine the volume of air in the airbag at a given time and, subsequently, determine needed supplemental down force. Too little down force on the row unit and the seed will be planted to shallow. On the other hand, too much down force will ensure penetration by the opener but also cause over compaction of the soil again leading to root development and germination problems. Second, sensing loads on a gauge wheel do not provide a direct measurement of how deep the seed is actually being planted. Differences in soil types and condition can skew the data and lead to the farmer guessing on the actual furrow depth. Finally, providing supplemental down force on a row unit through conventional biasing means does not actually change the depth at which seed is being planted. Instead, these systems are limited to providing a consistent singular depth.

Accordingly, there remains a need for an apparatus, method and system which does not primarily rely on conventional sensing means, but instead relies on adjusting the row unit based on detection of certain furrow characteristics, e.g., furrow depth and moisture level. There also remains a need for an apparatus, method and system which can adjust the depth at which seed is being planted.

SUMMARY

In one example, remote cutting depth adjustment system is provided.

In another example, a method of adjusting a cutting depth of a row unit of an agricultural device is provided.

In yet another example, a remote cutting depth adjustment system is provided and may include a tractor and an agricultural device. The tractor includes a control system and the agricultural device includes a row unit including a pair of cutting blades, an actuator, and a sensor. The sensor is capable of sensing a parameter or characteristic associated with a cutting depth of the cutting blades and the control system is capable of receiving the sensed parameter and displaying information on a user interface associated with the sensed parameter. The user may input information via an input device to alter the cutting depth of the cutting blades by moving the actuator. Alternatively, the control system may receive the sensed parameter and communicate with the actuator to move the actuator, thereby adjusting the cutting depth of the cutting blades.

In still another example, an agricultural device adapted to plant seeds is provided and includes a frame, a furrow opener coupled to the frame and adapted to cut a furrow including a depth, a sensor adapted to sense a characteristic associated with planting seeds and generate a signal associated with the sensed characteristic, and a processing unit receiving the signal associated with the sensed characteristic. The depth of the furrow is adjustable based on the signal associated with the sensed characteristic.

In a further example, a row unit adjustment system for use with an agricultural planter for planting seeds is provided. The agricultural planter includes a row unit including a frame and a furrow opener coupled to the frame and adapted to cut a furrow including a depth. The row unit adjustment system includes an actuator coupled to the row unit and adapted to adjust the depth of the furrow, a sensor adapted to sense a characteristic associated with planting seeds and generate a signal associated with the sensed characteristic, and a processing unit in communication with the sensor and the actuator, and wherein the processing unit is adapted to receive the signal associated with the sensed characteristic and communicate with the actuator to adjust the depth of the furrow based on the signal.

In yet a further example, a method of adjusting a depth of a furrow opened by a row unit of an agricultural planter is provided. The row unit includes a frame and a furrow opener coupled to the frame. The method includes sensing a characteristic associated with seed planting with a sensor, generating a signal associated with the characteristic with the sensor, communicating the signal to a processing unit, and adjusting a depth of a furrow opened by a row unit based on the signal received by the processing unit.

Figure 1:
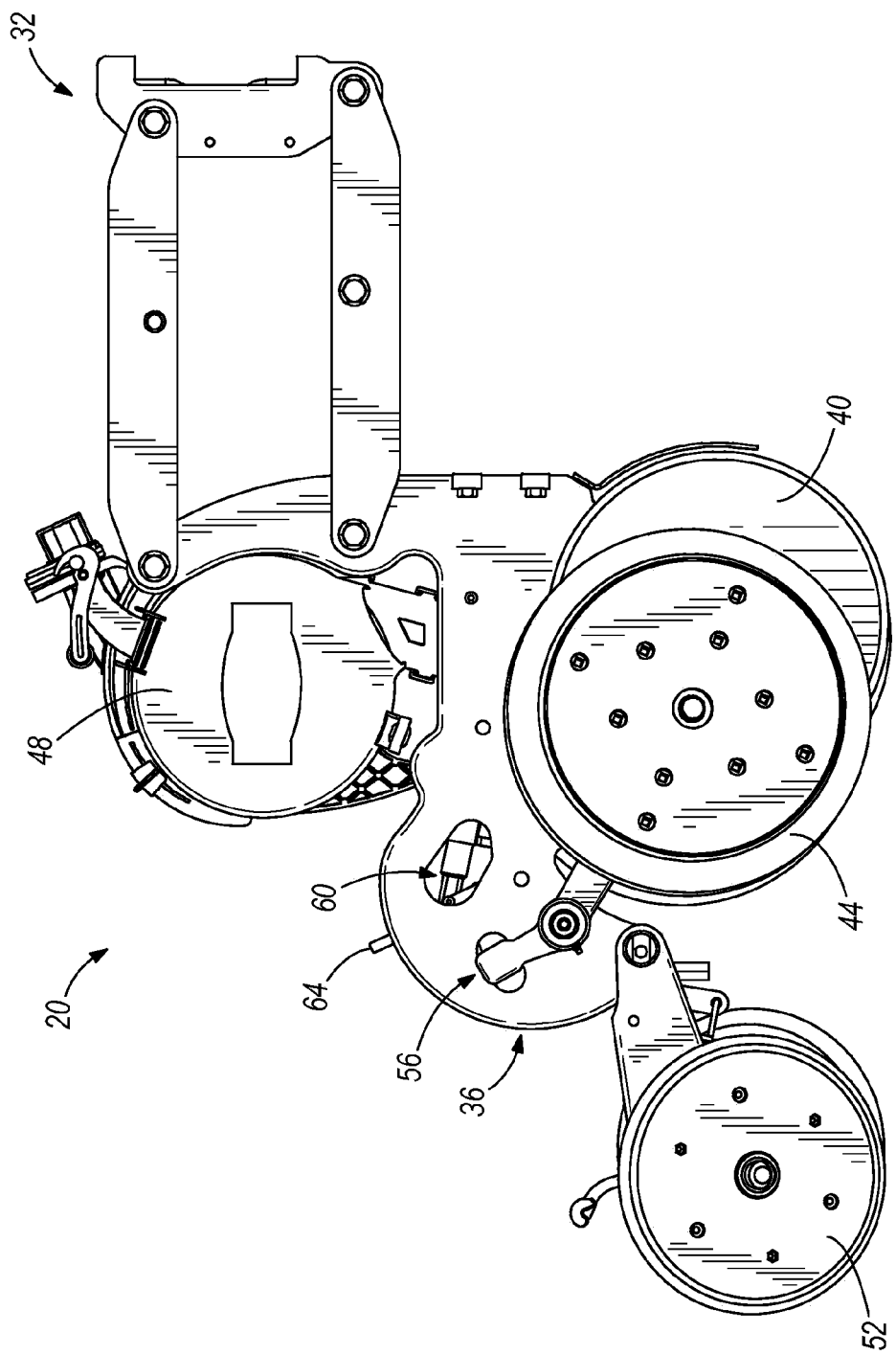
FIG. 1 is a side elevation view of an exemplary row unit of an agricultural device, the exemplary row unit including an exemplary actuator assembly of a remote depth adjustment system.

Before any independent features and embodiments of the invention are explained in detail, it is to be understood that the invention is not limited in its application to the details of the construction and the arrangement of the components set forth in the following description or illustrated in the drawings. The invention is capable of other embodiments and of being practiced or of being carried out in various ways. Also, it is understood that the phraseology and terminology used herein is for the purpose of description and should not be regarded as limiting.

DETAILED DESCRIPTION

The contents of U.S. patent application Ser. No. 13/458,012, filed Apr. 27, 2012, entitled "AGRICULTURAL DEVICES, SYSTEMS, AND METHODS FOR DETERMINING SOIL AND SEED CHARACTERISTICS AND ANALYZING THE SAME", and U.S. patent application Ser. No. 13/457,815, filed Apr. 27, 2012, entitled "DOWN AND/OR UP FORCE ADJUSTMENT SYSTEM", are incorporated herein by reference.

With reference to FIG. 1, an exemplary row unit 20 of an agricultural device 24 (see FIG. 7) is illustrated. The exemplary row unit 20 may be any of a wide variety of row units having various capabilities and functionalities Likewise, the agricultural device 24 may be any of a wide variety of agricultural devices capable of including row units and having various capabilities and functionalities. In the illustrated exemplary embodiment, the agricultural device is a planter 24 and the row unit is a planter row unit 20. The following description and associated figures relate to the exemplary embodiment of a planter 24 and a planter row unit 20. However, it should be understood that the illustrated exemplary planter 24 and planter row unit 20 are not intended to be limiting and the present invention is capable of being used with a wide variety of different agricultural devices and row units, and still be within the spirit and scope of the present invention.

In the illustrated exemplary embodiment, the planter 24 may include a plurality of similarly configured planter row units 20, each of which is capable of planting seeds in the soil. For simplicity, only one planter row unit 20 will be illustrated and described herein. However, it should be understood that a planter 24 is capable of having any number of row units 20 and the numerous row units 20 may be similarly configured and have similar functionality to the illustrated and described exemplary planter row unit 20.

During planting, the furrow depth cut by the row unit 20 may be adjusted from time to time for a variety of reasons including, but not limited to, soil conditions, row unit performance, type of seed, moisture content of soil, soil compaction, opener blade wear, soil type, etc. An exemplary remote cutting depth adjustment system 28 (see FIG. 7) is provided for remotely adjusting the cutting depth of the row unit 20. Such remote adjustment of the row unit cutting depth may be performed from a cab of a tractor (described in greater detail below).

With continued reference to FIG. 1, an exemplary planter row unit 20 is illustrated and may be coupled to a frame or toolbar (not shown) of a tractor by a coupling 32. The row unit 20 includes a frame 36 coupled to the coupling 32, a furrow opener or pair of flat circular disc blades 40 coupled to the frame 36 to open a seed trench or furrow in the soil, a pair of depth gauge wheels 44 coupled to the frame 36 and located adjacent to and slightly to a rear of the blades 40, a seed meter 48 which "singulates" seed from a seed hopper (not shown) and deposits the seed into the furrow formed by the twin disc opener blades 40, and a pair of spaced apart closing wheels 52 coupled to the frame 36 and positioned to follow after the planted seed for breaking down the furrow side walls on either side of the furrow and cover the seed, close the furrow, and firm the soil over the covered seed. The gauge wheels 44 determine, at least in part, the depth of the furrow formed by the opener blades 40.

The cutting depth of opener blades 40 may be adjusted through a depth-adjusting lever mechanism 56 that changes the vertical height of the frame 36 relative to gauge wheels 44, which ride on the soil. Opener blades 40 are carried by the frame 36 and the lever mechanism 56 adjusts the operating depth of the blades 40 relative to the gauge wheels 44 and, therefore, relative to the top surface of the soil.

Figure 2:
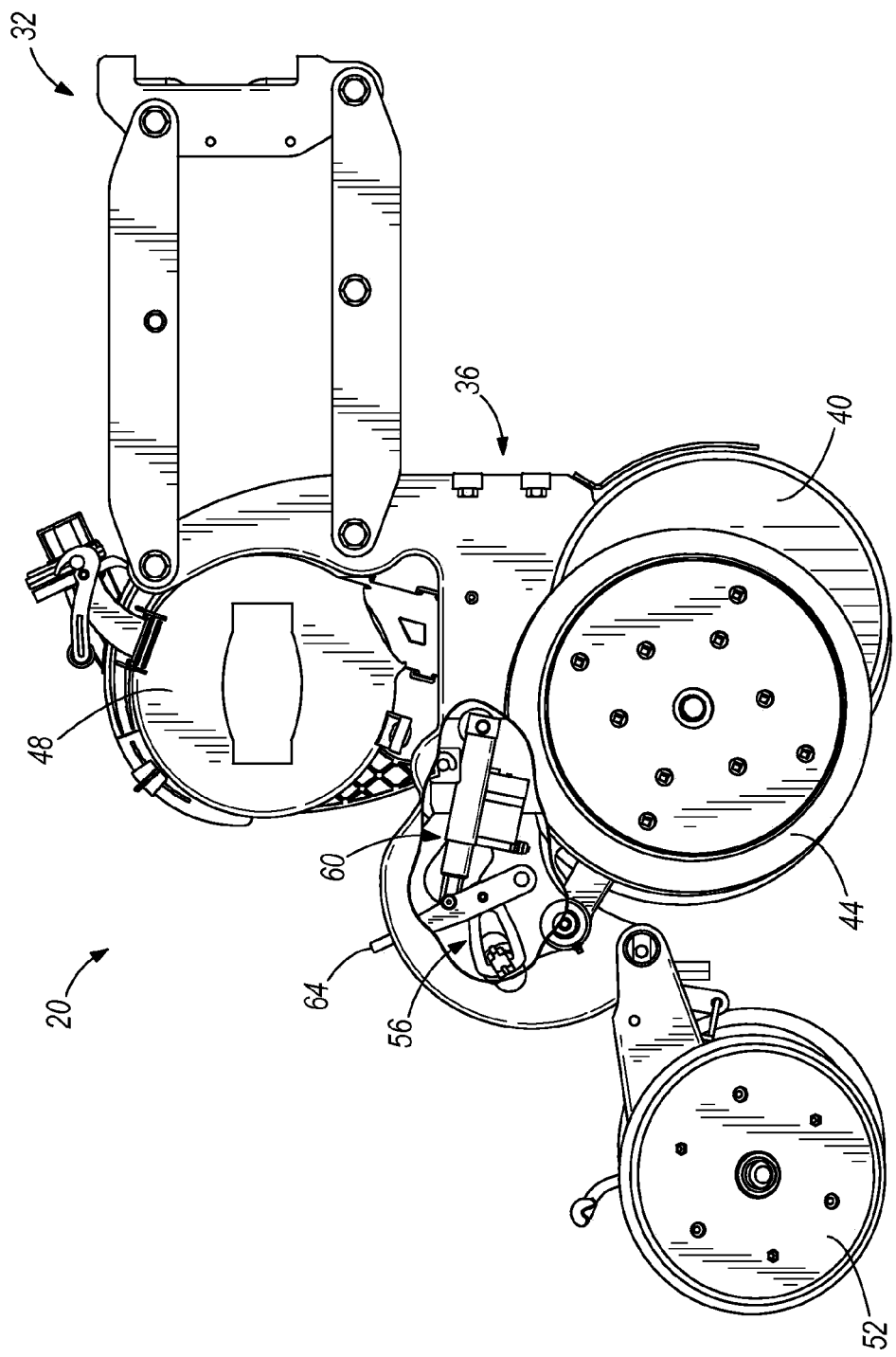
FIG. 2 is a side elevation view similar to FIG. 1 with a portion of the row unit broken-away for illustrative purposes.
Figure 3:
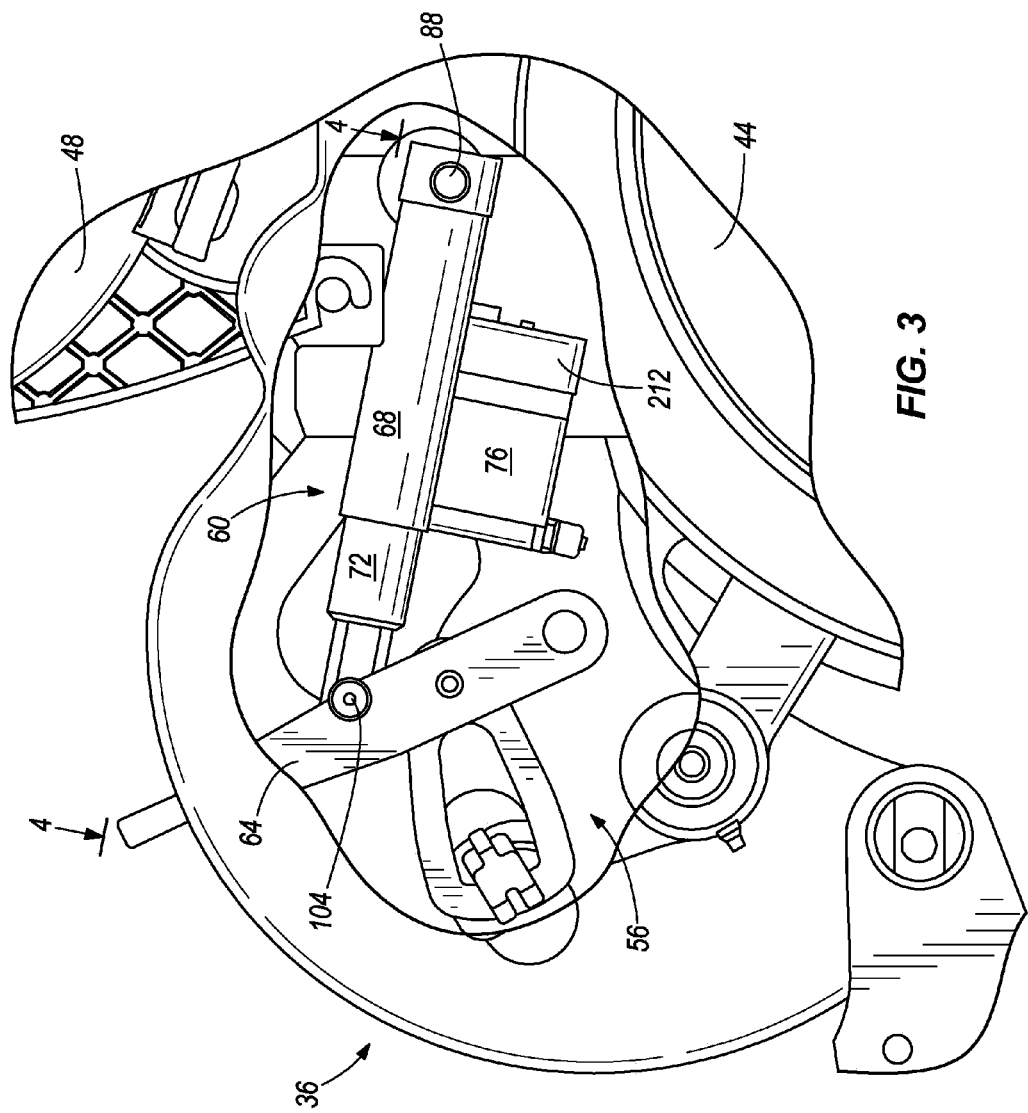
FIG. 3 is an enlarged side elevation view taken from FIG. 2 of a portion of the row unit.
Figure 4:
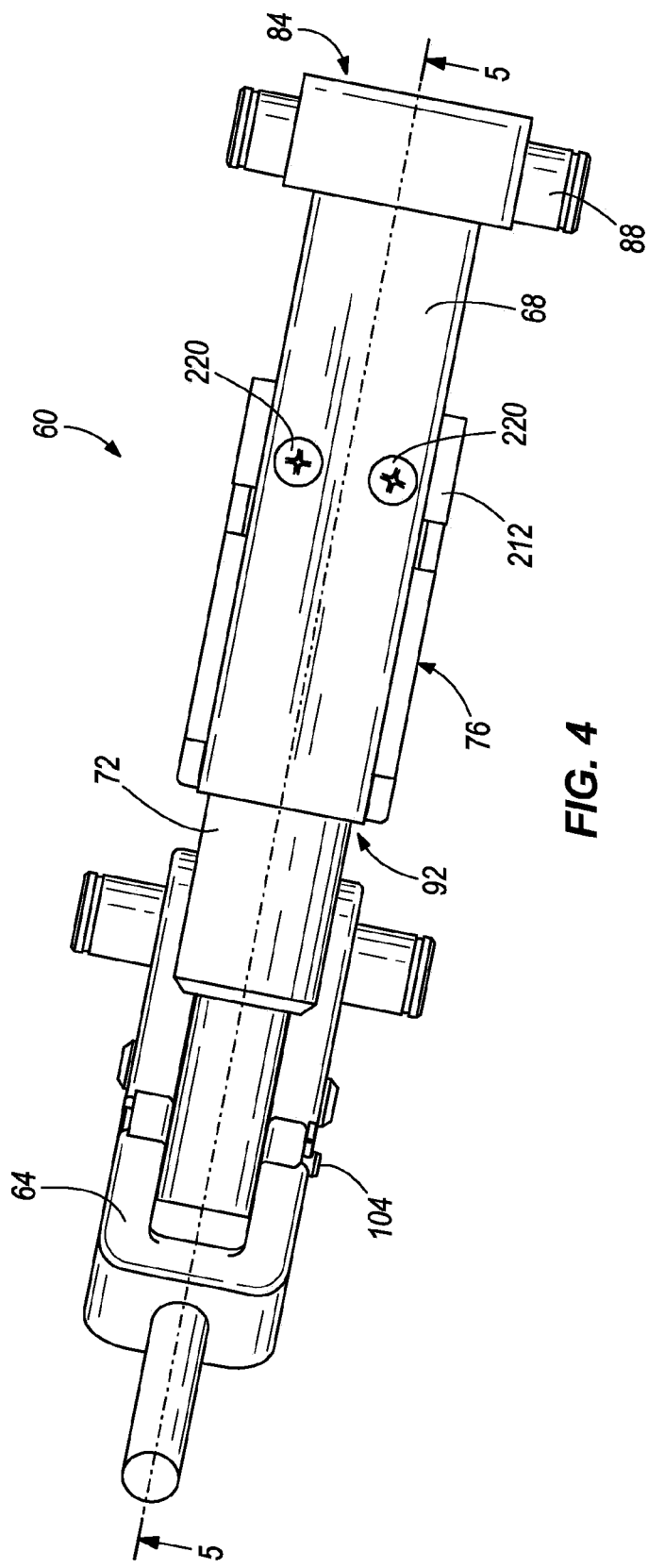
FIG. 4 is a view taken along line 4-4 in FIG. 3.
Figure 5:
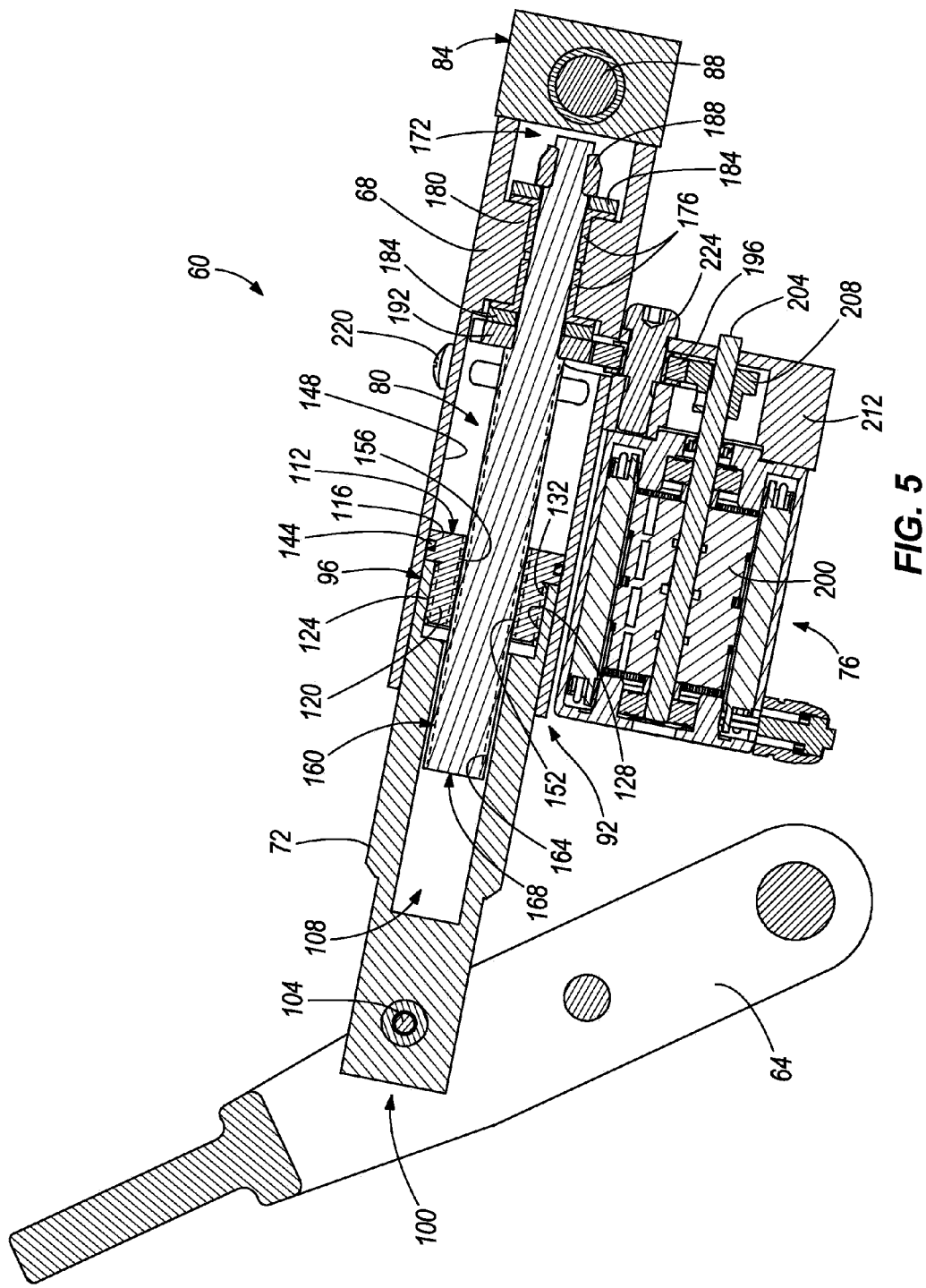
FIG. 5 is a cross-sectional view taken along line 5-5 in FIG. 4.
Figure 6:
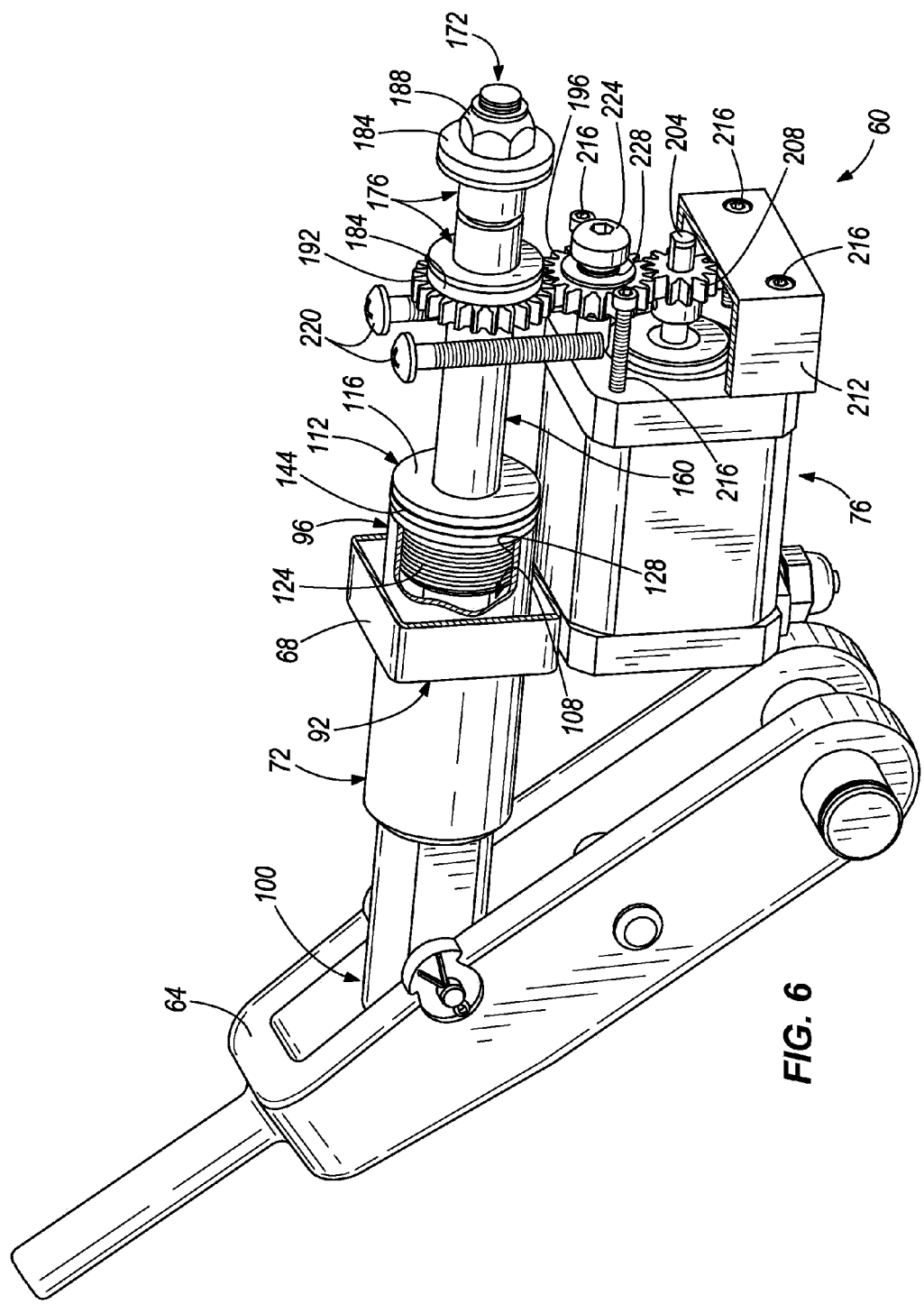
FIG. 6 is a top perspective view of a portion of the actuator assembly with a portion of the actuator assembly broken away to show internal components.

Referring now to FIG. 2, the frame 36 includes two side panels with a portion of the proximate side panel cut-away to show a portion of the remote cutting depth adjustment system 28, which includes the depth-adjusting lever mechanism 56. The depth-adjusting lever mechanism 56 and associated components are similar to the depth-adjusting lever mechanism and associated components disclosed in U.S. Pat. No. 6,148,747, the entire content of which is incorporated herein by reference. Thus, the components and functionality of the depth-adjusting lever mechanism 56 and associated components will not be described fully herein. Rather, the components and functionality of the depth adjusting lever mechanism 56 necessary to convey the present invention will be identified, illustrated, and described herein in more detail.

With continued reference to FIG. 2 and additional reference to FIGS. 3-6, the remote cutting depth adjustment system 28 includes an exemplary actuator 60 coupled to a handle 64 of the depth-adjusting lever mechanism 56 for moving the handle 64. In accordance with the disclosure of U.S. Pat. No. 6,148,747, movement of the handle 64 ultimately adjusts the cutting depth of the opener blades 40 and the depth of the furrow. The actuator 60 may be any type of actuator such as, for example, a linear actuator, rotary actuator, a pneumatic actuator, a hydraulic actuator, an electrical actuator, any combination thereof, etc., and may be respectively coupled to and powered by a pneumatic source, a hydraulic source, an electrical source, any combination thereof, etc. In the illustrated exemplary embodiment, the actuator is a linear electrical actuator 60 and is coupled to and powered by an electrical power source (described in more detail below). It should be understood that the illustrated exemplary embodiment of the actuator 60 and power source are not intended to be limiting upon the present invention and any type of actuator and power source may be utilized and be within the intended spirit and scope of the present invention.

With reference to the illustrated exemplary embodiment of the actuator 60, the actuator 60 includes a housing 68 coupled to the frame 36 of the row unit 20, a moveable arm 72 coupled to and linearly translatable relative to the housing 68, and a drive mechanism 76 coupled to the housing 68 and the arm 72 for moving the arm 72 relative to the housing 68.

The housing 68 defines a cavity 80 therein and includes a first end 84 pivotally coupled to the frame 36 by a pin 88. A second end 92 of the housing 68 opens into the cavity 80. The arm 72 includes a first end 96 positioned and moveable within the housing cavity 80 and a second end 100 pivotally coupled to the handle 64 via a pin 104. The arm 72 also defines a cavity 108 therein with the first end 96 of the arm 72 opening into the arm cavity 108. A nut 112 is coupled to the arm 72 at the first end 96 and may be coupled to the arm 72 in a variety of manners. In the illustrated exemplary embodiment, the nut 112 includes a shoulder 116, a reduced diameter portion 120, and threads 124 defined in an exterior of the reduced diameter portion 120. The reduced diameter portion 120 including threads 124 therein threads into the open first end 96 of the arm 72. A portion of an interior wall 128 of the arm 72 defines threads 132 therein that are complementary to the threads 124 defined in the exterior of the nut 112. The nut 112 is threaded into the open first end 96 of the arm 72 until the shoulder 116 abuts the first end 96 of the arm 72. A sealing member 144 such as, for example, an O-ring is disposed between the shoulder 116 and an interior surface 148 of the housing 68 to create a seal therebetween, thereby inhibiting contaminates from entering into the housing cavity 80.

The nut 112 also defines an aperture 152 therethrough and threads 156 in an interior surface of the nut 112. The actuator 60 also includes a drive shaft 160 defining threads 164 in at least a portion of an exterior surface of the drive shaft 160 and the drive shaft 160 is positioned within the nut aperture 152 and threadably coupled to the nut 112 via the complementary threads 156, 164. A first end 168 of the drive shaft 160 is positioned within the arm cavity 108 and a second end 172 of the drive shaft 160 is positioned within the housing 60. The drive shaft 160 is supported near its second end 172 by a pair of bushings 176 surrounding the drive shaft 160 and disposed between the drive shaft 160 and an interior shoulder 180 of the housing 68. A pair of washers 184 encircle the drive shaft 160 with one positioned at the end of each bushing 176 to assist with maintaining the bushings 176 in position. The bushings 176 enable the drive shaft 160 to rotate relative to the housing 68 without significant friction. A securement nut 188 is threaded to the second end 172 of the drive shaft 160 to inhibit the drive shaft 160 from translating relative to the housing 68. Specifically, the drive shaft 160 is capable of rotating relative to the housing 68, but is inhibited from translating relative to the housing 68. A gear 192 is fixedly coupled to the drive shaft 160 intermediate the first and second ends 168, 172 of the drive shaft 160 and meshes with an intermediary gear 196 of the drive mechanism 76.

The drive mechanism 76 may be a wide variety of different mechanisms capable of rotating the drive shaft 160 of the actuator 60. The illustrated exemplary embodiment of the drive mechanism 76 is not intended to be limiting upon the present invention. The illustrated exemplary drive mechanism 76 includes a motor 200 electrically coupled to an electrical power source, an output shaft 204, an output gear 208 coupled to and rotatable by the output shaft 204, and an intermediary gear 196 meshing with the output gear 208 and the drive shaft gear 192. The intermediary gear 196 transfers rotation from the output gear 208 to the drive shaft gear 192, thereby rotating the drive shaft 160 when the motor 200 is activated. The drive mechanism 76 is coupled to a motor support 212 via a plurality of fasteners 216 and the motor support 212 is coupled to the actuator housing 68 via a plurality of fasteners 220. This configuration rigidly secures the drive mechanism 76 to the actuator housing 68. Other manners of rigidly connecting the drive mechanism 76 to the actuator housing 68 may be employed and all of such alternatives are intended to be within the spirit and scope of the present invention. The intermediary gear 196 is secured in place with a support rod 224 extending through a center of the intermediary gear 196 and coupled to the motor support 212. A bearing 228 is disposed between the intermediary gear 196 and the support rod 224 to facilitate rotation of the intermediary gear 196 relative to the support rod 224.

Now that structural components of the actuator 60 have been described, operation of the actuator 60 will be addressed.

With continued reference to FIGS. 2-6, the drive mechanism 76 may be driven in either direction in order to rotate the drive shaft 160 in either direction. When the drive mechanism 76 is activated, the output shaft 204 rotates the output gear 208, which rotates the intermediary gear 196, the drive shaft gear 192, and ultimately the drive shaft 160. Since the drive shaft 160 is inhibited from translating, the drive shaft 160 merely rotates relative to the housing 68. The coupling of the threads 164 on the exterior of the drive shaft 160 with the threads 156 defined in the aperture 152 of the nut 112 causes the nut 112 to translate along the drive shaft 160, which translates the arm 72 relative to the actuator housing 68. Ultimately, the arm 72 is coupled to the handle 64 of the depth-adjusting lever mechanism 56 and translation of the arm 72 moves the handle 64. Depending on the direction of motor rotation, the arm 72 may be pulled into the housing 68, which results in movement of the handle 64 in a clockwise direction (as viewed in FIG. 2) or toward the actuator 60, or the arm 72 may be pushed out of the housing 68, which results in movement of the handle 64 in a counter-clockwise direction (as viewed in FIG. 2) or away from the actuator 60. Movement of the handle 64 in a clockwise direction reduces the cutting depth of the blades 40 and reduces the depth of the furrow, and movement of the handle 64 in a counter-clockwise direction increases the cutting depth of the blades 40 and increases the depth of the furrow. When the drive mechanism 76 is not activated, the actuator 60 is secured in place to secure the handle 64 in place, thereby maintaining the blades 40 at their cutting depth.

Figure 7:
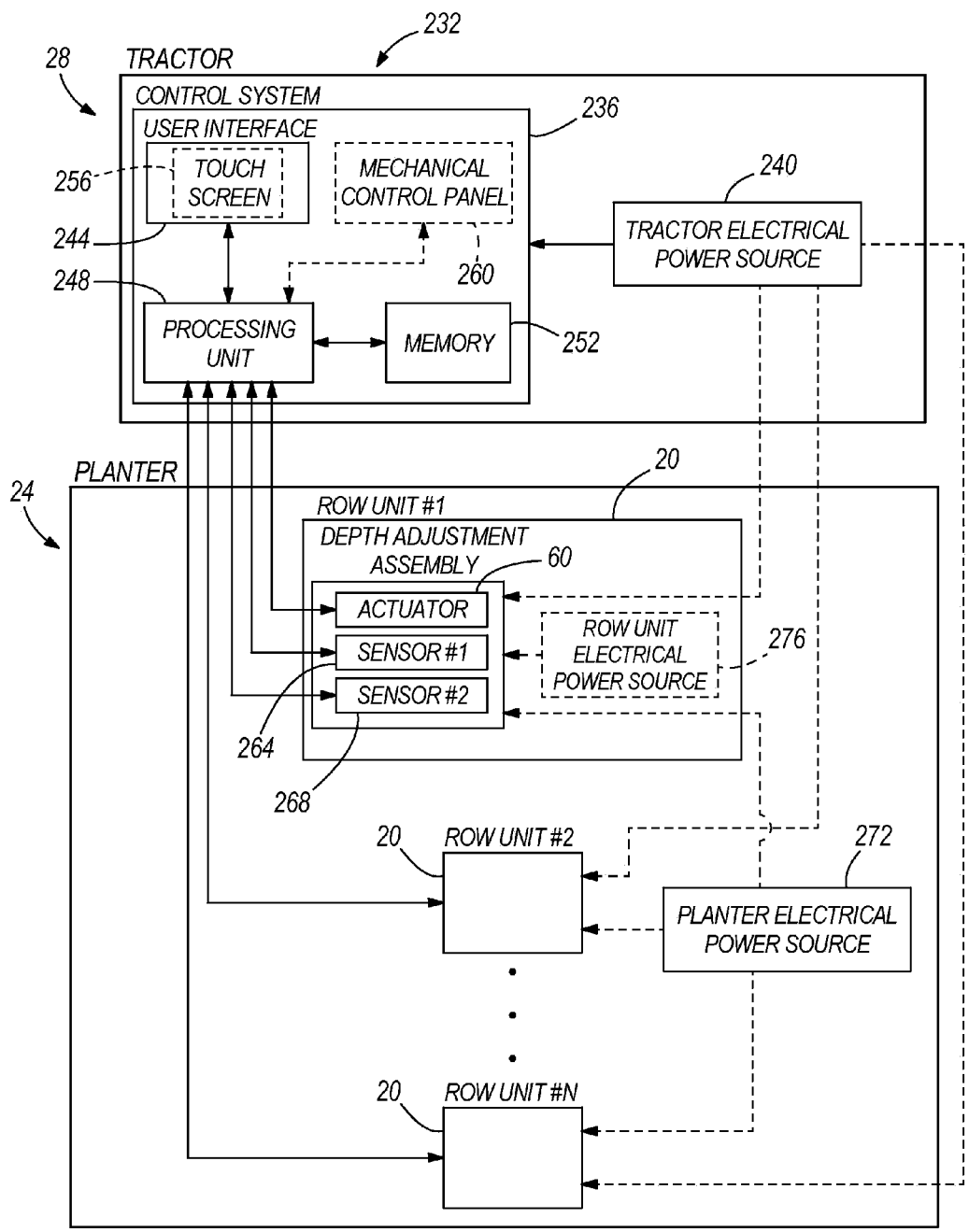
FIG. 7 is a diagram of an exemplary remote depth adjustment system for an agricultural device having a plurality of row units.

Referring now to FIG. 7, a diagram of an exemplary remote cutting depth adjustment system 28 is illustrated. The exemplary remote cutting depth adjustment system 28 is not intended to be limiting and a variety of other remote cutting depth adjustment systems may be utilized and still be within the intended spirit and scope of the present invention.

The illustrated exemplary remote cutting depth adjustment system 28 includes a tractor 232 and an agricultural device 24 such as, for example, a planter coupled to and pulled by the tractor 232. The tractor 232 includes a control system 236 and an electrical power source 240 for powering the control system 236. The control system 236 includes a user interface 244, a processing unit 248, and memory 252. In some exemplary embodiments, the user interface 244 may have touch-screen capabilities 256, thereby providing the user with an output display for viewing information and a manner of inputting information via a touch-screen keyboard, buttons, or other touch-screen controls and capabilities. In other exemplary embodiments, the user interface 244 may only be an output device to display information and the control system 236 may include a mechanical control panel 260 including a variety of mechanical switches, buttons, etc. manipulatable by a user to input desired information. In further exemplary embodiments, the control system 236 may include a combination of a touch-screen user interface and a mechanical control panel to output and input desired information. The processing unit 248 performs the necessary processing to achieve the desired functionality of the remote cutting depth adjustment system 28 and communicates with the input devices, output devices, memory, and the agricultural device as necessary to achieve such desired functionality.

With continued reference to FIG. 7, the agricultural device may be a planter 24 and the planter 24 may include a plurality of planter row units 20. The planter 24 may include any number of row units 20, which is exemplified by the annotations: Row Unit #1; Row Unit #2; . . . ; Row Unit #N. As indicated above, the row units 20 may be substantially the same and, therefore, only details of Row Unit #1 are shown in great detail. It should be understood that all of the row units 20 may include similar components and functionality to that of Row Unit #1, but such components and functionality will not be presented herein for the sake of brevity.

Row Unit #1 includes actuator 60 described above and illustrated in FIGS. 2-6. The actuator 60 is coupled to the handle 64 of the depth-adjusting lever mechanism 56 and is capable of moving the depth-adjusting lever mechanism 56 to control the cutting depth of the blades 40 and the depth of the furrow. Row Unit #1 may include one or more sensors 264, 268 to identify the cutting depth of the blades 40 and the depth of the furrow. The cutting depth and furrow depth may be determined in a variety of manners using a variety of different types of sensors, which may sense a variety of different parameters or characteristics. For example, in the illustrated exemplary embodiment, each row unit 20 may include a first sensor 264 for sensing a position of the handle 64 and a second sensor 268 for sensing a furrow depth. It should be understood that each row unit 20 may include only one of these sensors, may include more than these two sensors for sensing additional parameters, or may include any combination of sensors for sensing any relevant parameters that ultimately contribute to determining the cutting depth of the blades 40 and the furrow depth. For example, in some exemplary embodiments, the row unit may include three sensors, a first sensor to sense a position of the handle, a second sensor to sense a furrow depth, and a third sensor to sense soil moisture.

Figure 8:
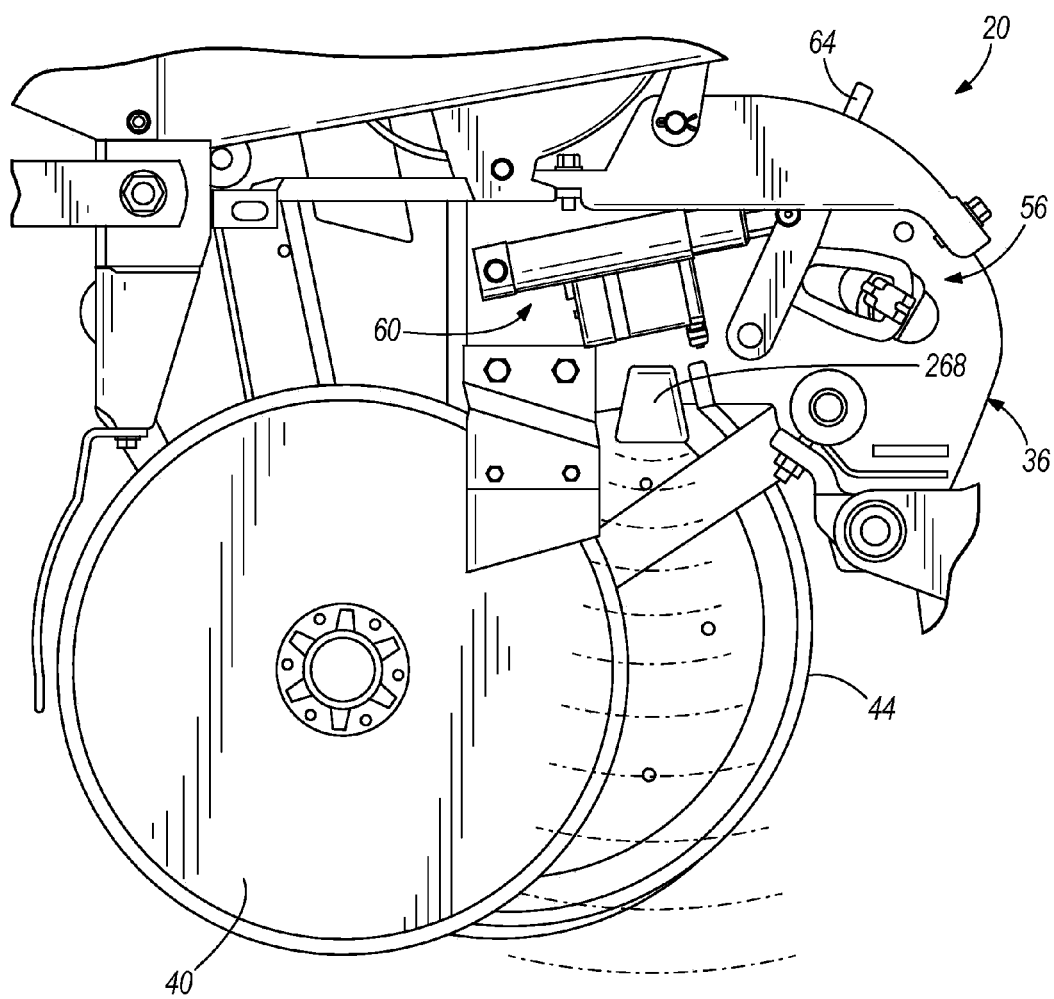
FIG. 8 is a side elevation view of a portion of the row unit shown with an exemplary sensor.

The first sensor 264 for sensing a position of the handle 64 may be any type of sensor such as, for example, an ultrasonic sensor, laser sensor, etc., and may be coupled to any portion of the row unit 20 as long as it can operate appropriately to sense the position of the handle 64. In some exemplary embodiments, the first sensor 264 may be coupled to an interior of the frame 36 proximate the handle 64. The second sensor 268 for sensing a furrow depth may be any type of sensor such as, for example, an ultrasonic sensor, laser sensor, etc., and may be coupled to any portion of the row unit 20 as long as it can operate appropriately to sense a furrow depth. In some exemplary embodiments, the second sensor 268 may be coupled to the frame 36 and be directed downward toward the soil and the furrow cut therein (see FIG. 8).

In further exemplary embodiments, the remote cutting depth adjustment system 28 may include an additional sensor such as, for example, a force transducer that is coupled to the depth-adjusting lever mechanism 56 for monitoring and/or measuring a down force occurring in the depth-adjusting lever mechanism 56 and applied to the row unit 20 to force the row unit 20 downward toward the soil. The force transducer may be any type of sensor such as, for example, a load cell, a pressure sensor, a potentiometer, etc., and may be coupled to any portion of the depth-adjusting lever mechanism 56 as long as it can operate appropriately to sense a down force. Such a force transducer may be electronically coupled to the processing unit 248 to enable the processing unit 248 to take readings of the down force and display related information to a user via the user interface 244 or to enable the processing unit 248 to communicate with the necessary components of the remote cutting depth adjustment system 28 to adjust the cutting depth of the row unit 20.

The sensors 264, 268 generate a signal associated with the sensed parameter and the processing unit 248 communicates with the sensors 264, 268 to receive the signal. The processing unit 248 utilizes signal and the information included therein received by the sensors 264, 268 and displays desired information on the user interface 244 for a user to view. In some exemplary embodiments, the displayed information may include a cutting depth of the blades 40 and/or a furrow depth. The user may alter the cutting depth of the blades 40 and the furrow depth if desired. To do so, the user makes the desired adjustment by inputting a desired cutting depth or furrow depth via one or more of the touch-screen user interface 256, mechanical control panel 260, or any other input device. Then, the processing unit 248 receives the inputted data and communicates with the actuator 60 to move the actuator 60 and adjust the cutting depth of the blades 40 as desired by the user. The one or more sensors 264, 268 monitor their respective parameters as the actuator 60 adjusts the cutting depth, generate signals based on the sensed parameters, communicate the signals associated with the sensed parameters to the processing unit 248, and the processing unit 248 drives the actuator 60 until the one or more sensors 264, 268 sense and communicate the appropriate parameter corresponding to the desired cutting depth of the blades 40. The processing unit 248 deactivates the actuator 60 when the appropriate cutting depth has been achieved. Deactivation of the actuator 60 maintains the actuator 60 in place, thereby securing the row unit 20 at the desired cutting depth.

In the illustrated exemplary embodiment, the actuators 60 and the sensors 264, 268 of the row units 20 are electrically powered. The actuators 60 and the sensors 264, 268 may be electrically powered in a variety of different manners and all of such manners are intended to be within the spirit and scope of the present invention. In some exemplary embodiments, the actuators 60 and the sensors 264, 268 of all the row units 20 may be electrically powered by an electrical power source 272 of the agricultural device (e.g., the planter) 24. In other exemplary embodiments, the actuators 60 and the sensors 264, 268 of all the row units 20 may be electrically powered by the tractor electrical power source 240. In further exemplary embodiments, each row unit 20 may include its own electrical power source 276 and the actuator 60 and sensors 264, 268 on a particular row unit 20 may be electrically powered by the electrical power source 276 on that row unit 20.

The above described electrical power sources may be a wide variety of types of electrical power sources and all of such various electrical power sources are intended to be within the intended spirit and scope of the present invention. For example, an electrical power source may be an alternator coupled with a hydraulic motor, an alternator coupled mechanically to the tractor engine, an alternator coupled with a ground drive, an alternator coupled with an electric motor, a batter pack, etc.

As indicated above, in some exemplary embodiments, the actuators 60 on the row units 20 may be pneumatic or hydraulic actuators, thereby requiring a pneumatic source or a hydraulic source to respectively power the actuators. In such exemplary embodiments and similarly to the electrically powered actuators, the actuators may be powered in a variety of manners. In some exemplary embodiments, the pneumatic or hydraulic actuators of all the row units 20 may be respectively powered by a pneumatic or hydraulic power source of the agricultural device (e.g., the planter) 24. In other exemplary embodiments, the pneumatic or hydraulic actuators of all the row units 20 may be respectively powered by a pneumatic or hydraulic source of the tractor 232. In further exemplary embodiments, each row unit 20 may include its own pneumatic or hydraulic power source and the actuator on a particular row unit 20 may be respectively powered by the pneumatic or hydraulic power source on that row unit 20.

The remote cutting depth adjustment system 28 may be either an open loop system or a closed loop system. In an open loop system, the cutting depth adjustment system 28 utilizes one or more sensors 264, 268 to sense one or more parameters, the processing unit receives the sensed parameter(s) and displays or otherwise outputs information to the user via a user interface 244, and the user is capable of making a desired adjustment to the cutting depth using input devices such as, for example, a touch-screen user interface 256 or mechanical control panel 260. In a closed loop system, the cutting depth adjustment system 28 utilizes one or more sensors 264, 268 to continuously sense one or more parameters in real-time, and the processing unit 248 receives the sensed parameter(s), displays or otherwise outputs information to the user via a user interface 244, determines if the sensed parameter(s) correspond(s) with a desired cutting depth, and communicates with the necessary components of the system 28 to adjust the cutting depth if the sensed parameter(s) does (do) not correlate to the desired cutting depth. Such a desired cutting depth may be input into the system by a user, may be based on historical data, may be determined based on parameters sensed by sensors, etc.

Figure 9:
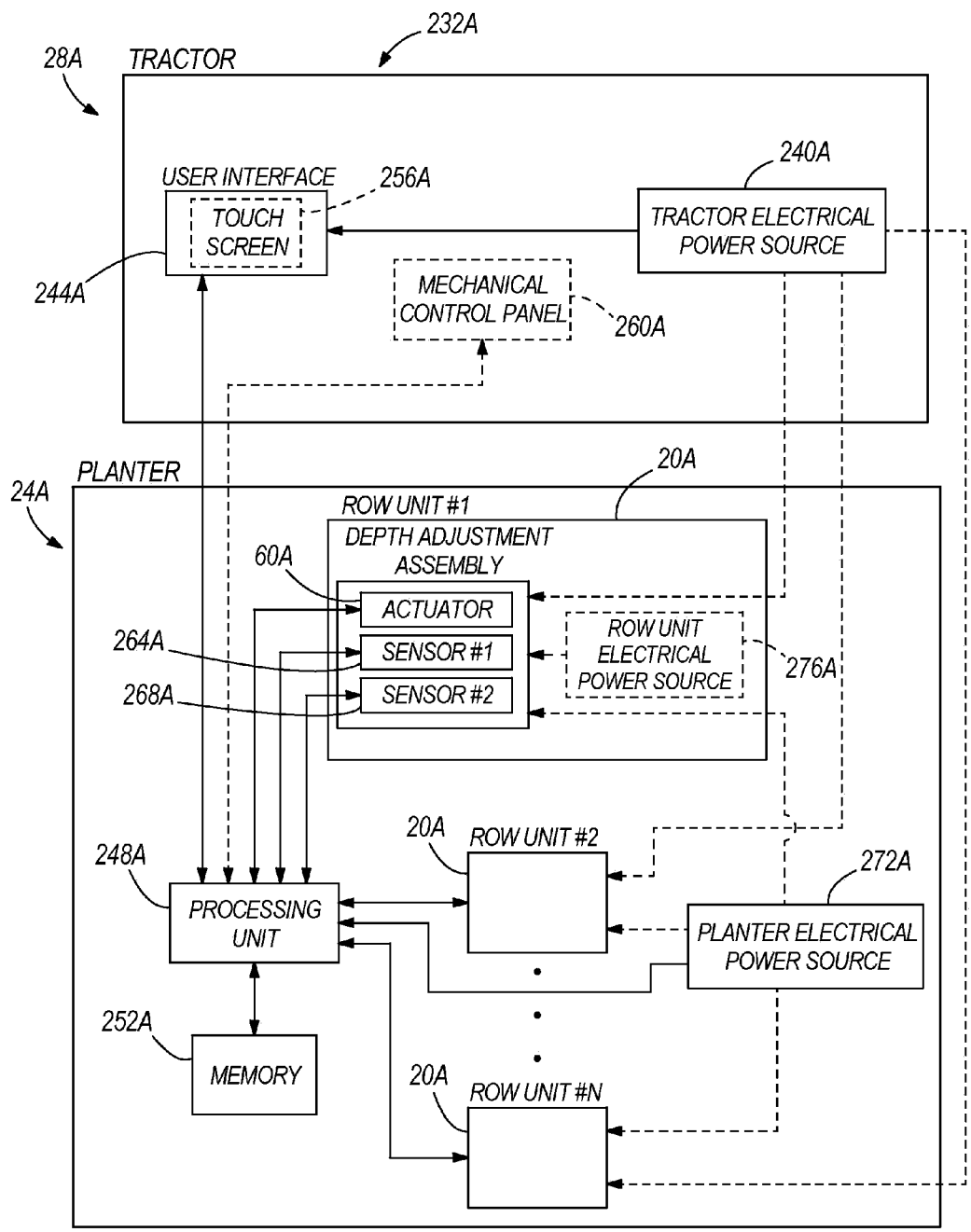
FIG. 9 is a diagram of another exemplary remote depth adjustment system for an agricultural device having a plurality of row units.

Referring now to FIG. 9, another exemplary remote depth adjustment system 28A is illustrated. The components of the system 28A illustrated in FIG. 9 that are similar to components of the system 28 illustrated in FIGS. 1-8 are identified with the same reference number and an "A".

The system 28A illustrated in FIG. 9 has many similarities to the system 28 illustrated in FIGS. 1-8. At least one difference between system 28A illustrated in FIG. 9 and system 28 illustrated in FIGS. 1-8 is that the agricultural device or planter 24A includes the processing unit 248A and the memory 252A, rather than the tractor 232A, which is the case in system 28. With the processing unit 248A included in the planter 24A, the planter electrical power source 272A may provide electrical power to the processing unit 248A. Even with this difference, the system 28A is capable of performing all the same functionality as the system 28 illustrated in FIGS. 1-8.

It should be understood that the processing unit, the memory, and any other components of the systems may be included on either the tractor or the planter and in any combination, and be within the intended spirit and scope of the present invention. For example, the planter may include the processing unit and the tractor may include the memory. Also, for example, the tractor may include the processing unit and the planter may include the memory.

The foregoing description has been presented for purposes of illustration and description, and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

What is claimed is:

1. A control and monitoring system for an agricultural planter having a plurality of row units, comprising:
    an actuator coupled to each row unit and adapted to adjust a depth of a furrow;
    a sensor adapted to sense a characteristic associated with planting seeds and generate a signal associated with the sensed characteristic; and
    a processing unit in communication with the sensor and the actuator, and wherein the processing unit is adapted to receive the signal associated with the sensed characteristic and communicate with the actuator to adjust the depth of the furrow based on the signal;
    said sensor being at least partially a solid state sensor.

2. The control and monitoring system of claim 1, wherein the characteristic of the soil is one of soil temperature, moisture content of soil, furrow depth, and soil type.

3. The control and monitoring system of claim 1, wherein the processing unit determines whether the depth of the furrow requires adjusting based on the signal and subsequently communicates with the actuator to adjust the depth of the furrow if the processing unit determines adjustment is necessary.

4. The control and monitoring system of claim 1, further comprising a user interface in communication with the processing unit.

5. The control and monitoring system of claim 4, wherein the processing unit displays information on the user interface based on the signal associated with the sensed characteristic.

6. The control and monitoring system of claim 5, wherein a user initiates communication between the processing unit and the actuator to adjust the depth of the furrow.

7. The control and monitoring system of claim 1, wherein the processing unit is in electrical communication with said actuator and said sensor.

8. The control and monitoring system of claim 1, wherein the sensor is one of
    an ultrasonic sensor;
    a laser sensor;
    a video camera;
    an infra-red sensor;
    an infra-red camera;
    an infra-red scanner;
    a potentiometer; and
    a microwave sensor.

9. The control and monitoring system of claim 1, wherein the sensor is a first sensor, the characteristic is a first characteristic, and the signal is a first signal associated with the first characteristic, the control and monitoring system further comprising a second sensor adapted to sense a second characteristic associated with planting seeds and generate a second signal associated with the sensed second characteristic.

10. The control and monitoring system of claim 9, wherein the processing unit receives the first signal and the second signal, and wherein the depth of the furrow is adjustable based on the first and second signals respectively associated with the sensed first and second characteristics.

11. The control and monitoring system of claim 1, wherein the sensed characteristic is compared with a parameter to determine if the actuator should be adjusted to adjust the depth.

* * * * *